Patented Oct. 5, 1954

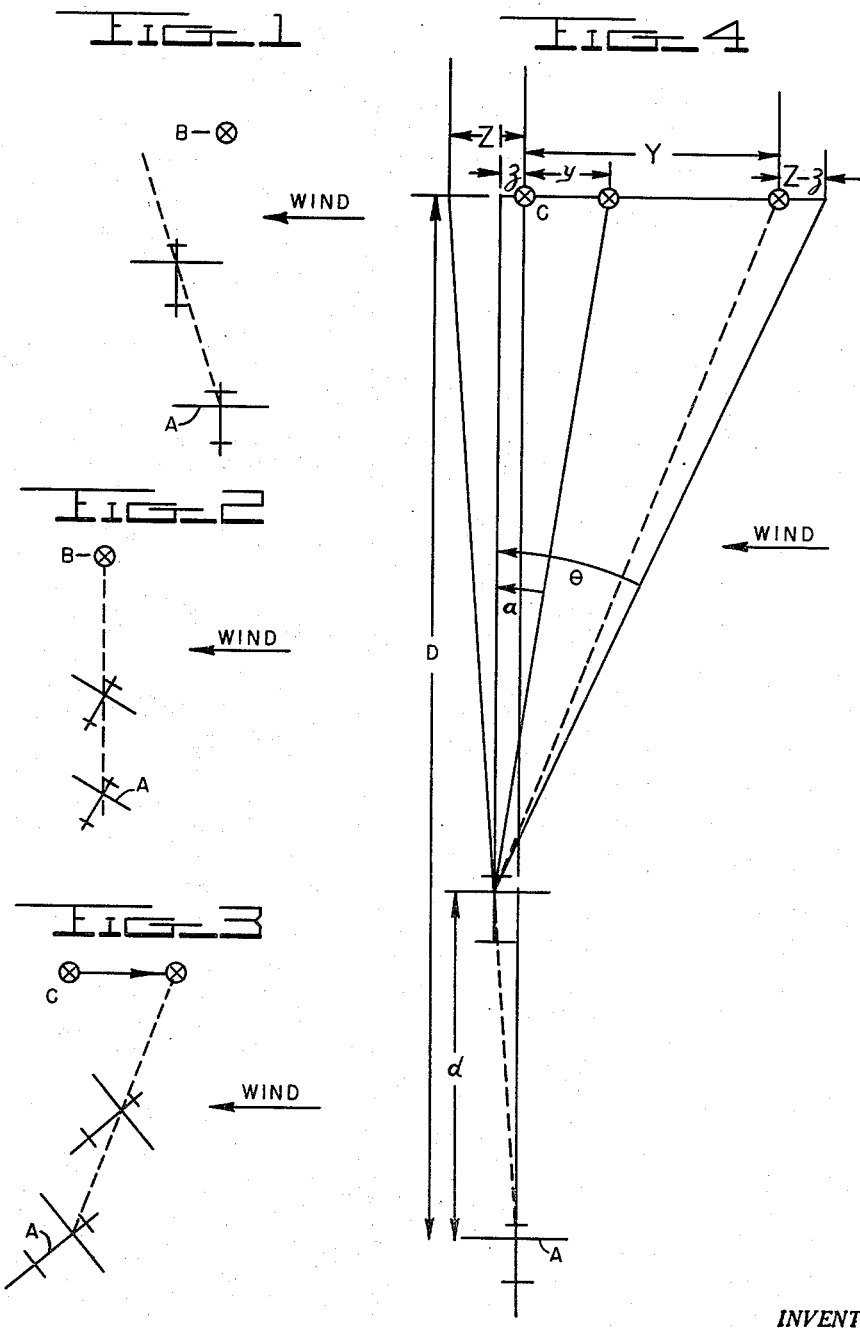

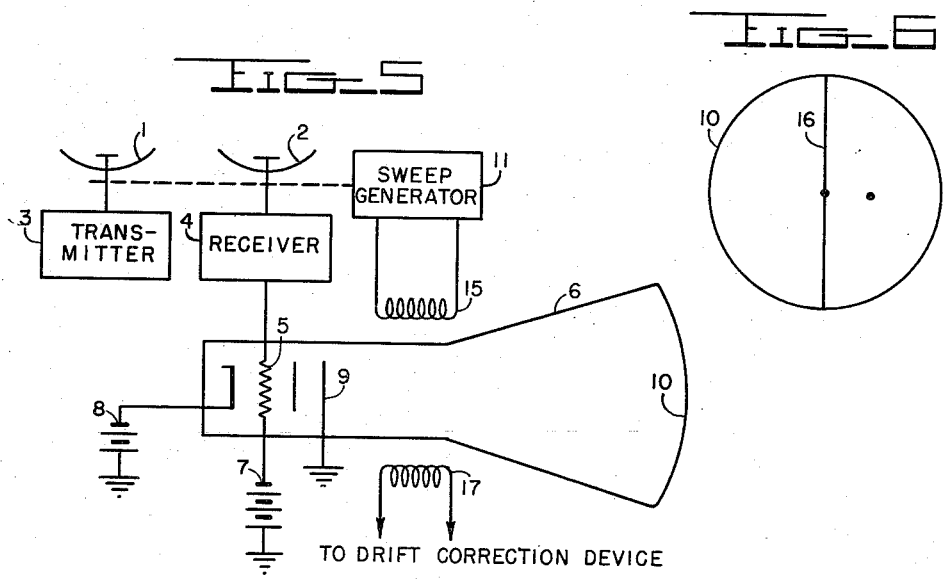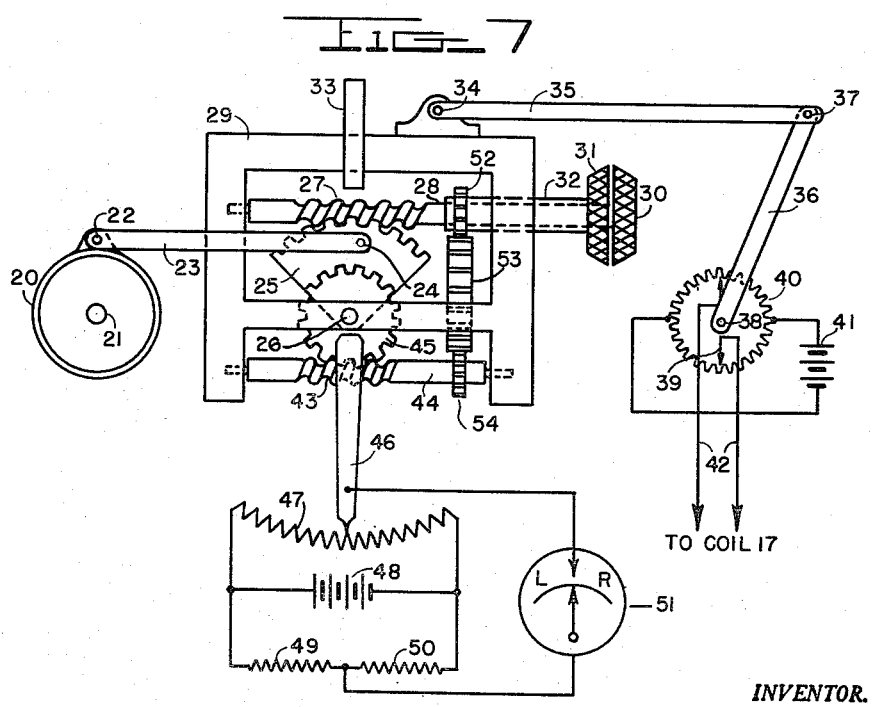

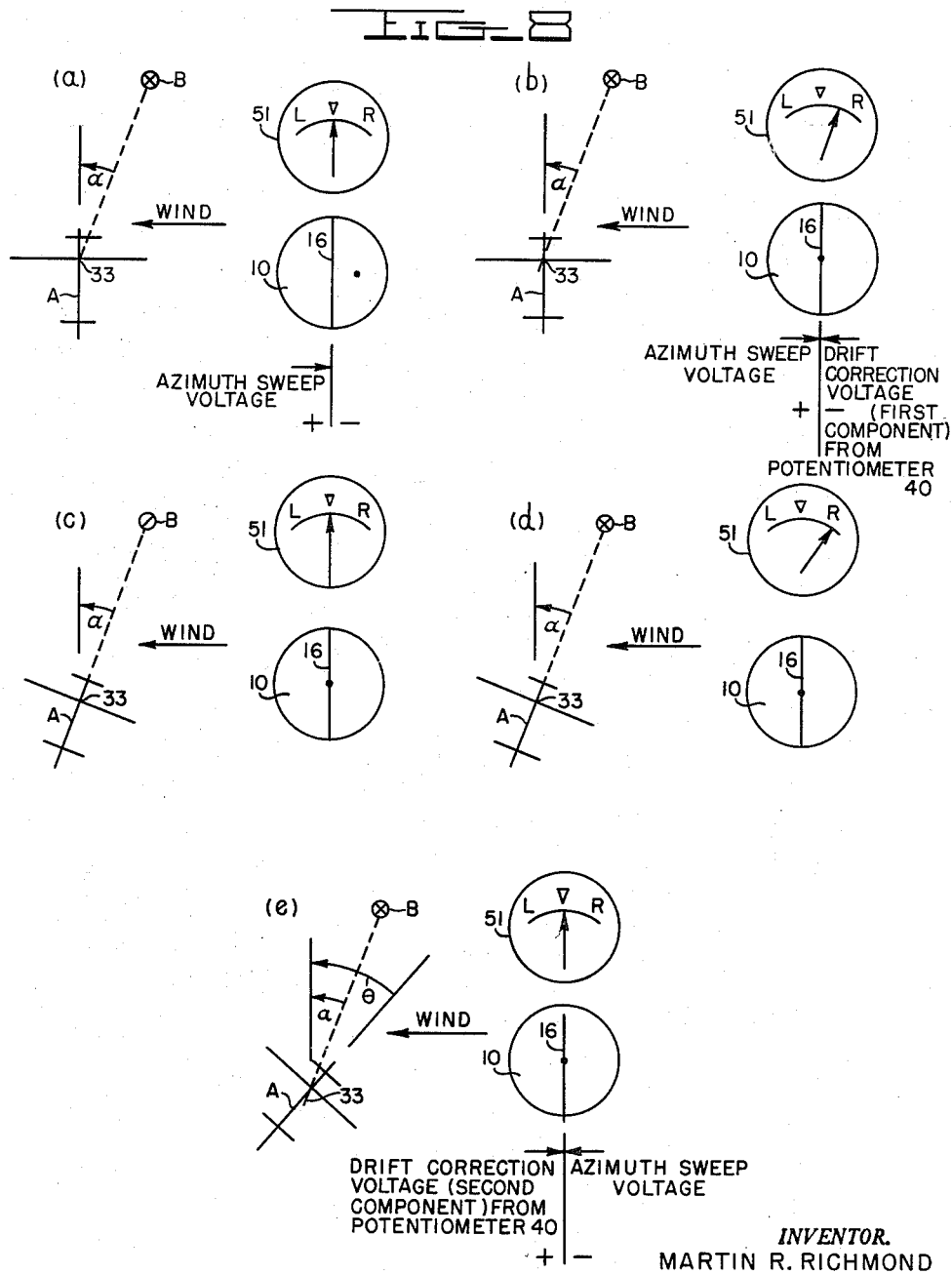

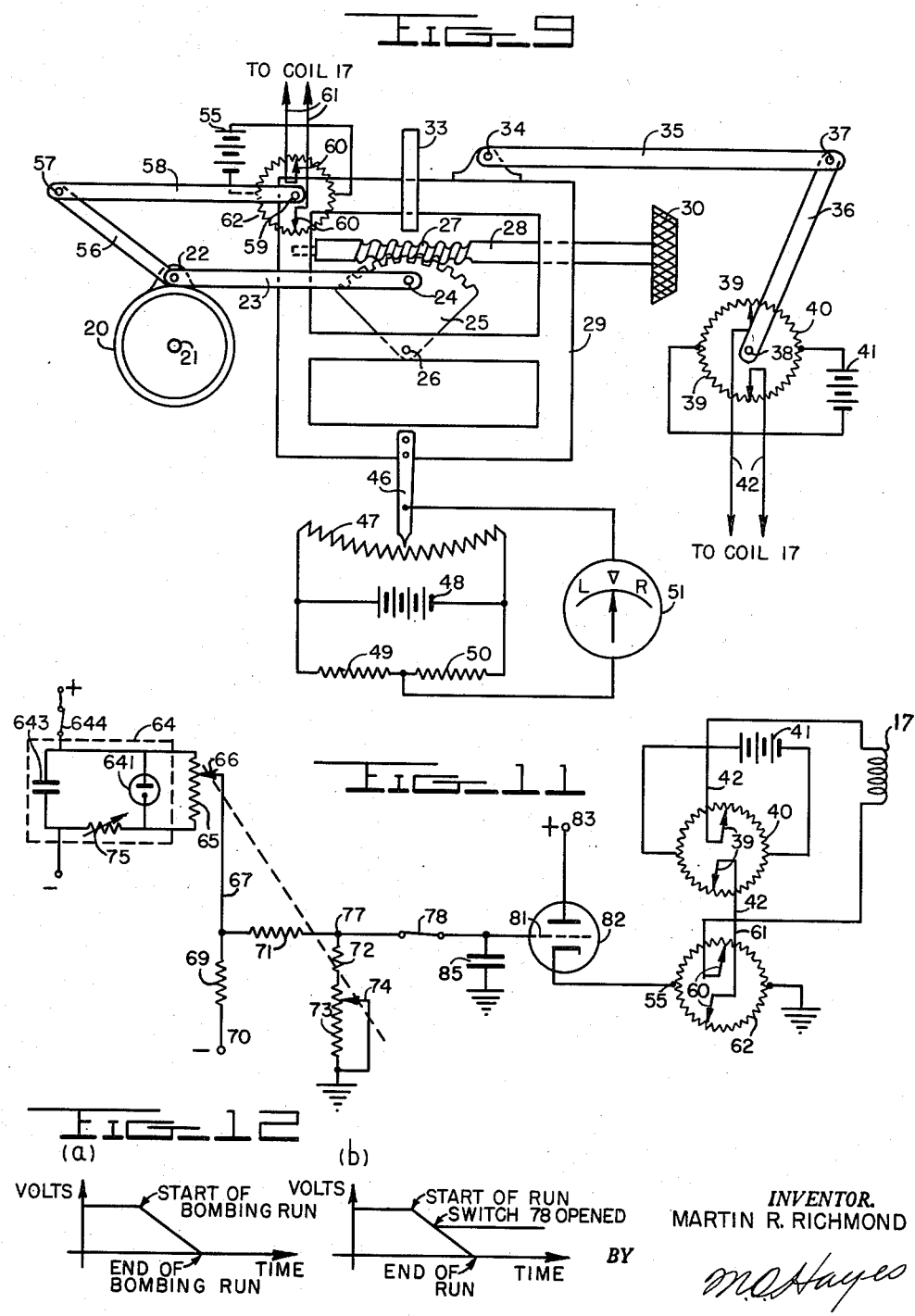

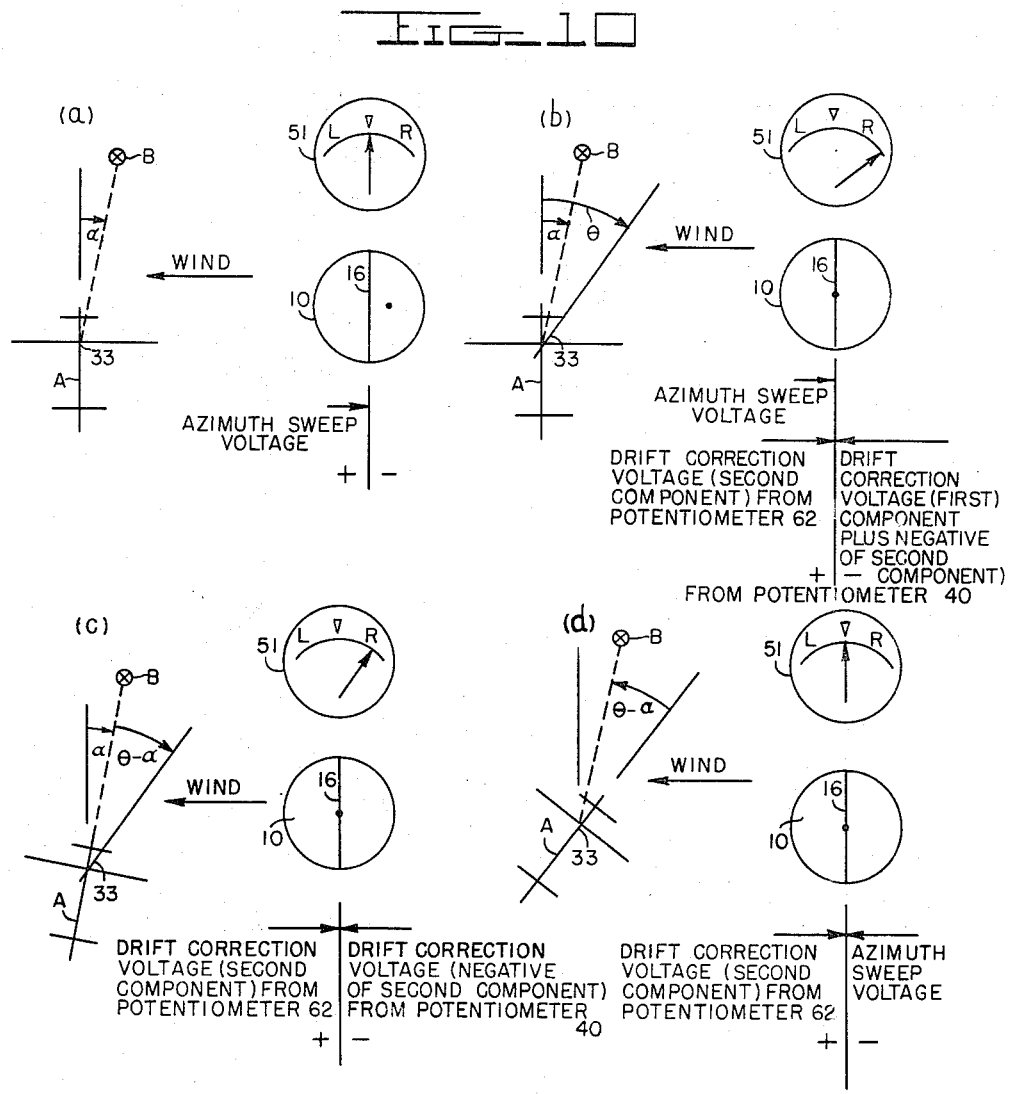

2,691,163

UNITED STATES PATENT OFFICE 2,691,163

RADIO NAVIGATIONAL AID

Martin R. Richmond, Nashua, N. H.

Application August 21, 1946, Serial No. 691,890

12 Claims. (Cl. 343—16)

(Granted under Title 35, U. S. Code (1952), sec. 266)

This invention relates to a radar, radar bombsight, or other radio navigational aid, and more particularly to an automatic drift correction device incorporated therein for obtaining a collision course with a target or radio beacon.

Radars, radar bombsights, and other radio navigational devices may be employed to indicate how to turn a moving vessel such as an airplane or ship in the azimuth plane, or in the elevation plane, or both, until the vessel is headed directly at a target or a radio beacon. In order to simplify the presentation, the invention will be described as in connection with azimuth corrections.

If there is no drift due to wind or sea currents, and if the target or beacon is stationary or is moving only along the same line of travel as the moving vessel, then once the plane or ship or other vessel is headed toward the object in question it will continue on a "collision course" with that object. That is, by continuing on the original heading its position in the horizontal will eventually coincide with that of the target or beacon.

However, if there are wind or sea currents having a component at right angles to the heading of the vessel, or if the target or beacon has a component of motion at right angles to the original heading of the vessel, then the original heading will not constitute a collision course. In such a case, to obtain a collision course a correction must be made in the original heading by turning the vessel toward the direction from which the wind or sea currents are coming or the direction in which the target is moving.

With navigational instruments of the type mentioned, the usual method of applying this correction for drift or movement of the target so as to produce a collision course is to observe how fast the vessel moves off the desired collision course and attempt to estimate the correction needed to bring it back on a collision course. This is a time-consuming and difficult trial and error method, however, since it is only the operator's guess as to how large a correction should be made each time, and several corrections may therefore be necessary.

Accordingly, it is an object of this invention to provide a device to be incorporated in a radar, radar bombsight, or other radio navigational aid which will automatically compute and apply the correction in heading, if any, which is required to bring a moving vessel on to a collision course with a given object after an original heading is first determined by the operator.

It is another object of the invention to provide such a device which will be operated by a setting which requires no exercise of trained judgment on the part of the operator, thus reducing greatly the time necessary to train operators for radars, radar bombsights, or other radio navigational aids to be used in plotting collision courses.

It is also an object of the invention to provide such a device which is operated by a single setting of a control, thus reducing the time and attention which must be spent by the operator in obtaining a collision course. This will make possible a considerably shorter bombing run, in the case of a bombing aircraft, for instance, and so will reduce the possibility of enemy defense action.

A more complete understanding of this invention will be obtained by reference to the following detailed description and the accompanying drawings, in which only one preferred embodiment of the invention has been illustrated:

Figures 1 through 3 show the effect of crosswinds or movement of the target upon an airplane attempting to fly a collision course, Figure 4 will be employed to explain a mathematical basis for the invention, Figure 5 is a diagrammatic representation of a radar system, and part of a radar bombsight frequently used in conjunction therewith, Figure 6 illustrates a type indication appearing on the indicator of the radar bombsight of Figure 5, Figure 7 shows in schematic diagram form a typical prior art type of drift correction device for use in the radar bomb sight system of Figure 5, Figure 8 shows several steps in the operation of the system shown in Figure 7, Figure 9 is a diagrammatic representation of an embodiment of this invention, Figure 10 shows several steps in the operation of the embodiment of this invention shown in Figure 9, Figure 11 is a schematic representation of an embodiment of this invention, Figure 12 illustrates certain voltages present during the operation of the herein described embodiment of the invention.

Referring now more particularly to the drawings, applicant, for the sake of brevity, will hereinafter only refer to one embodiment of the present invention as applied. It will be understood, of course, that the invention may also be employed to solve the problem of obtaining a collision course when other kinds of tracking vessels, navigational instruments, or objects being tracked are involved.

In the case of such a tracking airplane, crosswinds and movement of the object being tracked are the only factors that can cause the plane to drift off the desired collision course. For convenience, the correction to be applied to overcome the effect of both these factors will hereinafter be called "drift correction."

In general, Figure 1 illustrates the result if a plane A is headed directly at a stationary target B and remains on that original heading in the presence of crosswind. The dotted line shows the plane's actual course under these circumstances. Figure 2 illustrates how a drift correction could be applied at the start of the run to produce a collision course if the distance to stationary target B, the ground speed of the airplane, and the velocity of the wind component at right angles to the target's original bearing from the plane were known ahead of time. Figure 3 illustrates how a drift correction could be applied at the start of the run to plot a collision course if all these factors plus the velocity component of target C at right angles to the target's original bearing from the plane were known.

Figure 4 illustrates how the problem of plotting a collision course must be solved as a practical matter, when none of the factors mentioned is known at the start of the bombing run. As shown in that figure, plane A is headed directly toward moving target C at the start of the run. In the radar bombsight which is shown in Figure 5, a target spot will then appear in the horizontal center of the screen of the cathode ray tube indicator. The operator of this radar bombsight must observe the target spot on the screen to see whether it remains in the horizontal center of the screen or moves either right or left during the first part of the bombing run. If the spot has moved to the right, for example, when the plane has reached the second position shown in Figure 4, this would mean that the plane, although still on its original heading, is no longer headed directly toward the target as it was at the start of the run but is now headed to the left of the target.

When this movement of the target spot to the right is observed, it will be realized that in order to put the plane on a collision course with the target, the plane will have to be turned back toward the target and then turned an additional amount to the right to counteract the drift effect during the remainder of the run. These two turns are represented by angles $\alpha$ and $\theta-\alpha$, respectively, in Figure 4.

In the past, the above mentioned turns were effected by having the bombsight operator operate a turn control to cause the target spot to move back to the center, and to indicate on a pilot direction indicator that the plane is to be turned through the angle $\alpha$ to head it directly toward the target again. As he does this he tries to estimate by his past experience how much farther the plane must be turned in order to put it on a collision course with the target. Then, by adjustment of a second control called the drift control, as accurately as he possibly can he causes the pilot direction indicator to show the additional angle $\theta-\alpha$. (The operation of this equipment is explained in more detail below with reference to Figures 5 through 8.)

It is very probable that the operator will not be able to estimate the second angle of correction $\theta-\alpha$ exactly correctly the first time. Thus he must watch again to see if the target spot moves to the right or left of the horizontal center of the screen and repeat the process of estimating the necessary angle of drift correction.

With this trial and error process it is apparent that each operator will need considerable training and experience in the use of the equipment. But by modifying the equipment according to this invention the drift correction can be accurately and simply computed and applied by the single setting of the turn control described above which returns the target spot to the center of the cathode ray tube screen. By this one operation the total number of degrees of turn $\theta$ necessary to establish a collision course can be indicated at once to the pilot without the necessity of repeated trial and error estimates by the operator.

To show the operation of this invention, the radar bombsight as heretofore known to the art and as illustrated in Figure 5 will first be described in more detail, with reference to Figures 5 through 8.

This bombsight is employed in conjunction with certain airborne radar installations, such as shown in Figure 5. Antenna 1 is a transmitting antenna which rotates continuously, and antenna 2 is a receiving antenna which rotates in synchronism therewith. These are shown as two antennas, but they may also be a single antenna employed in a manner well known in the art. Transmitter 3 produces a series of recurrent pulses of electromagnetic energy waves, which are fed to transmitting antenna 1. Receiver 4 delivers output impulses only when the transmitting and receiving antennas are directed toward the target being tracked, as the antennas are highly directional and have narrow beam radiation patterns.

The intensity grid 5 of the cathode ray indicator tube 6 of the radar bombsight is normally returned to a source of negative potential 7 that is just below the potential required to cut off the electron beam in tube 6 when the cathode is returned to a source of negative potential 8 and the second anode 9 of the tube is grounded. The voltage output impulses from receiver 4 are positive and of such a value that when applied to grid 5 of tube 6 the electron beam will reappear in the tube and a large number of electrons will strike fluorescent screen 10 and produce a target spot thereon.

An azimuth sweep voltage is generated by sweep generator 11 which is operated in synchronism with antennas 1 and 2. The value of this voltage at any instant is proportional to the angular displacement of the antennas from the zero bearing position from the plane. This azimuth sweep voltage is applied to the horizontal deflection apparatus of cathode ray tube 6, which is shown as electromagnetic deflecting coil 15 in Figure 5.

It will be seen that under these conditions the horizontal position of the electron beam at any instant will be singularly characteristic of the bearing of the target from the aircraft. Figure 6 examples the type indication on the indicator screen when the target being tracked lies to the right of zero bearing. Hair line 16 is a permanent mark indicating the horizontal center of the screen. In the radar bombsight being described the target spot is kept vertically centered automatically, so the target spot is shown in the vertical center of the screen in Figure 6 and also in Figures 8 and 10, where other examples of the indication on the cathode ray tube screen are shown.

As stated above and illustrated in Figure 4 when a bombing run is begun the airplane is headed directly at the target. In this position of the plane, at the instant the echo pulses from the target are received the azimuth sweep voltage will be zero and the target spot will thus appear in the center of the screen.

However, if there is a wind having a component at right angles to the line of flight of the plane, say from the right, or if the target moves to the right, then if the plane remains on the original heading its actual course will drift to the left as shown in Figure 4 and the target spot will move to the right on the screen. After he notices this, the operator of the radar bombsight then signals to the pilot through the pilot direction indicator what the size of the above-described angles $\alpha$ and $\theta - \alpha$ should be.

In doing this, the operator makes adjustments which will produce voltages which will hereinafter be called the two components of the "drift correction voltage." These two components of the drift correction voltage correspond in magnitude to the two angles $\alpha$ and $\theta - \alpha$. The production of each component will be described separately, with reference to Figures 7 and 8.

As shown in Figure 7, an azimuth gyroscope 20 is free to rotate about shaft 21, which is fixed to the airplane. This gyroscope provides in pin 22 a point which is fixed in azimuth with respect to shaft 21. Connecting rod 23 can rotate about pin 22 at one end and at the other end about pin 24 which is fixed to sector gear 25. Sector gear 25 is free to rotate about shaft 26 which is fixed to the airplane. The dimensions involved are so chosen that the center points of shafts 21 and 26 and pins 22 and 24 form a parallelogram. It will be seen that when gyroscope 20 is in operation and thus pin 22 is fixed in azimuth with respect to shaft 21, then pin 24 is fixed in azimuth with respect to shaft 26. In other words, sector gear 25 is then held stationary in space in azimuth.

Sector gear 25 engages worm gear 27, whose shaft 28 is journaled in the side members of frame 29. Frame 29, hereinafter referred to as the "drift head" or "reference frame," is free to rotate about shaft 26. Shaft 28 is terminated by turn control knob, drift control 31, is positioned adjacent to turn control 30 at the termination of a hollow shaft 32 which is coaxial with shaft 28 and is also journaled in a side member of drift head 29. The two control knobs are so constructed and located that they may be gripped by the operator separately or together.

It will be observed that if turn control 30 is rotated, then, because of the action of gears 25 and 27, drift head 29 and all parts connected to it will rotate together in azimuth about sector gear 25, which is held stationary by the action of the gyroscope. This rotation in azimuth will include the telescope 33 of the optical bombsight associated with the radar bombsight, since telescope 33 is fixed to the drift head.

This rotation about sector gear 25 will also include, of course, pin 34. Connecting rod 35 is rotatably attached to pin 34 at one end and rotatably attached to connecting rod 36 by means of pin 37 at the other. The other end of rod 36 rotates around shaft 38, and has fixed to it contact brushes 39 which sweep the circular winding of potentiometer 40. Opposite sides of potentiometer 40 are connected to source of D. C. potential 41. Shaft 38 and the winding of potentiometer 40 are attached to the airplane. The dimensions involved are so chosen that the center points of shafts 26 and 38 and pins 34 and 37 form a parallelogram. Therefore, whenever drift head 29 is rotated one degree in azimuth about sector gear 25 by rotation of turn control 30, brushes 39 are also rotated one degree in azimuth with respect to the winding of potentiometer 40.

Referring now to Figures 8(a) and 8(b), it will be observed that the number of degrees which the drift head (and telescope attached thereto) must be rotated to face toward the target is just equal to the number of degrees the radar antenna is displaced from the dead ahead position at the instant the echo pulses are received. Now, the voltage variation per degree is made the same in potentiometer 40 and in the azimuth sweep voltage generating means 11 described above. Therefore, the rotation of drift head 29 to face it toward the target will generate a voltage across leads 42 which is exactly equal to the azimuth sweep voltage which determines the position of the target spot on screen 10.

This voltage across leads 42 is the first component of the drift correction voltage mentioned above. As will be understood, if impressed across drift correction coil 17 of indicator tube 6 it will exactly oppose the azimuth sweep voltage and will thus center the target spot horizontally on screen 10. This centering of the target spot is the indication by which the radar bombsight operator is advised that turn control 30 has been turned enough to produce the first component of the drift correction voltage and to show that turn on the pilot direction indicator which will be sufficient to bring the airplane facing directly toward the target.

Before describing the production of the second component of the drift correction voltage, the operation of the pilot direction indicator will be described. This indicator is automatically controlled by the interaction of turn control 30, drift head 29, and the airplane, as will be explained with reference to Figures 7 and 8. The above-described rotation in azimuth of drift head 29 and connected members which results from a rotation of turn control 30 includes worm gear 43 and its shaft 44 which is journaled as shown in the side-members of drift head 29. Gear 45 is engaged in worm gear 43 and is free to rotate about shaft 26, so it also rotates with respect to sector gear 25 as turn control 30 is rotated. The rotation of gear 45 is transmitted to arm 46 which is attached to gear 45 at one end and which makes contact with the arcuate winding of potentiometer 47 at the other end. Said winding is attached to the airplane. Opposite ends of potentiometer 47 are connected to source of D. C. potential 48. The two halves of the winding of potentiometer 47 together with resistors 49 and 50, which are equal in value, form a bridge across which meter 51 is connected so as to indicate the current flow which results when the point of contact between arm 46 and potentiometer 47 is displaced from the electrical center of the potentiometer. As will be seen, the magnitude and sign of the meter reading will correspond respectively to the magnitude and direction of rotation of turn control 30. Because of this correspondence, meter 51 can be used as a pilot direction indicator to show the pilot of the airplane how to turn the plane in azimuth.

Proceeding now to a description of the production and application of the second component of the drift correction voltage, reference should be made to Figure 8.

Figure 8(a) illustrates the conditions prevailing when the target spot is noticed off center after a part of the bombing run, which was begun by heading plane A directly at target B, has been traversed. At this point the only voltage applied to the horizontal deflecting means of indicator tube 6 is the azimuth sweep voltage. The arrow so labelled represents the azimuth sweep voltage at the instant the echo pulses are received.

Figure 8(b) illustrates the conditions prevailing when the target spot is returned to the center of the screen by the operator's rotation of turn control 30. As indicated, telescope 33 is now directed toward the target, the first component of the drift correction voltage—equal and opposite to the azimuth sweep voltage—has been applied to deflecting coil 17 and has centered the target spot, and a right turn is indicated on the pilot direction indicator.

Figure 8(c) represents the conditions prevailing after the pilot has turned the plane, in response to the showing of the pilot direction indicator, until the plane is headed directly toward the target. By the turning of the plane the azimuth sweep voltage and the first component of the drift correction voltage have both been removed from the horizontal deflecting coils, and the pilot direction indicator shows no turn.

Figures 8(d) and 8(e) relate to the last two steps in bringing the plane to a collision course by means of the radar bombsight in question. Before discussing these figures the means for producing and applying the second of the two components of the drift correction voltage will be described.

Referring again to Figure 7, it will be seen that rotation of drift control 31 will be transmitted through shaft 32 and gears 52, 53, and 54 to worm gear 43. Rotation of drift control 31 alone will therefore produce rotation of gear 45 and arm 46 with respect to sector gear 25 without any accompanying rotation of drift head 29. Thus, if drift head 29 and telescope 33 have been turned toward the target through angle $\alpha$ by adjustment of turn control 30 as described above, then the additional angle $\theta - \alpha$ through which the plane must be turned to put the plane on a collision course can be indicated to the pilot by actuating the pilot direction indicator through rotation of drift control 31 alone.

When the pilot turns the plane through the indicated angle $\theta - \alpha$ in response to the pilot direction indicator, arm 46 will be returned to the electrical center of potentiometer 47. At the same time, the azimuth sweep voltage at the instant the echo pulses from the target are received will increase from zero to a value proportional to the bearing of the target from the plane. Also at the same time the relative motion of potentiometer 40 (attached to the plane) and brushes 39 (fixed in azimuth through linkage with gyroscope 20) will produce across leads 42 a voltage equal and opposite to the azimuth sweep voltage just mentioned. This is the second component of the drift correction voltage.

Figure 8(d) represents the situation existing after the radar bombsight operator has turned drift control 31 the amount he estimates will bring the plane to a collision course. As indicated, the target spot is still centered on screen 10 because the steps shown in Figures 8(d) and 8(e) are assumed to take place immediately after the step shown in Figure 8(c), so the plane is still facing directly toward the target. The turn of the plane which the operator has estimated will produce the second component of the drift correction voltage is indicated on the pilot direction indicator.

Figure 8(e) represents the conditions existing after the pilot has turned the plane through angle $\theta - \alpha$ in response to the pilot direction indicator. The pilot direction indicator has returned to the center position, and the target spot has remained horizontally centered because of the opposing action described above between the azimuth sweep voltage and the second component of the drift correction voltage.

As has been said, the second component of the drift correction voltage, representing angle $\theta - \alpha$, is selected by the operator arbitrarily, depending on his training and experience with the equipment and his estimate of how quickly his rotation of turn control 30 brought the target spot back to the center of screen 10.

In the radar bombsight described, provision is made for fixing ahead of time, if desired, the relative magnitude of the two parts of the drift correction voltage by increasing the angular rotation of worm gear 43 compared to that of worm gear 27 for equal rotations of drift control 31 and turn control 30, respectively. Then if the two controls are gripped and turned together by the operator the second part of the drift correction voltage will be larger than the first part by a fixed ratio. However, it will be noted that the ratio of the two parts of the drift correction voltage is still an arbitrarily chosen one not necessarily related to the actual values of wind velocity and target velocity which determine what drift correction is actually required for a collision course.

This invention, on the other hand, provides, as indicated in Figures 9 through 12, a means of computing and applying, with one simple control setting, the exact drift correction which is required for a collision course under the circumstances existing during the bombing run.

This invention is based upon a mathematical relationship illustrated in Figure 4. In that figure airplane A is shown as beginning a bombing run towards a moving target C, then proceeding to a second position at which drift created by a cross-wind from the right, and motion of the target to the right, is observed. The quantity D is the range to the target at the start of the bombing run; $z$ is the lateral distance which plane A has drifted because of the cross-wind while it has traversed the distance $d$ parallel to its original heading; Z is the total lateral distance the plane would drift during the run because of the cross-wind if it remained on its original heading until it had traversed the distance D parallel to its original heading; the angle $\alpha$ is the angle between the original heading of the plane and the line of bearing to target C from the plane after the distance $d$ has been traversed; Y is the distance traveled by the target at right angles to the original heading of plane A in the time it would take plane A to cover distance D; $y$ is the distance traveled by the target while the plane is traveling the distance $d$; and $\theta$ is the total angle through which the plane must be turned at the end of distance $d$ to bring it to a collision course with moving target C.

The following relationships will be observed from Figure 4:

(1) $$\tan \alpha = \frac{y+z}{D-d}$$

and (2)
$$\tan \theta = \frac{Y+Z}{D-d}$$

Dividing Equation 2 by Equation 1, we have:

(3)
$$\frac{\tan \theta}{\tan \alpha} = \frac{Y+Z}{y+z}$$

(4)
$$\tan \theta = \frac{Y+Z}{y+z} \tan \alpha$$

But note that $$y+z = \frac{d}{D}(Y+Z)$$

assuming that the wind velocity, and plane's velocity remain the same throughout the run. Therefore, (5)
$$\tan \theta = \frac{D}{d} \tan \alpha$$

For small angles this may be written (6)
$$\theta = \frac{D}{d} \alpha$$

(Equating $\theta$ and $\tan \theta$ in this way introduces an error of only 1.0% for $\theta=10°$, 2.3% for $\theta=15°$, and 4.1% for $\theta=20°$.)

Equation 6 presents a mathematical relationship upon which this invention is based.

This invention computes angle $\theta$ by measuring angle $\alpha$ and multiplying it by the fraction $$\frac{D}{d}$$

The same setting of the turn control which completes this calculation also operates to apply it to the pilot direction indicator. Thus, this invention automatically indicates to the pilot what turn is necessary to put the plane on a collision course, with a single setting by the operator instead of a series of trial and error settings.

One embodiment of this invention is represented diagrammatically by Figure 9. It will be noticed that this system is similar to the system of Figure 7 except for the removal of parts 31, 32, 52, 53, 54, 43, 44, and 45; the modification of parts 29 and 46; and the addition of parts 55 through 62.

If desired, the parts listed to be removed may be actually removed from the radar bombsight or they may merely be rendered inoperative by removal of drift control 31. If the parts listed are rendered inoperative in this way, arm 46 will act as if attached to drift head 29. However, if the parts listed are actually removed, then arm 46 must be physically attached to the drift head. In Figure 9 the latter embodiment is illustrated.

Potentiometer 62 is similar to potentiometer 40 but is fixed to drift head 29 instead of to the plane as is the latter member. Opposite sides of potentiometer 62 are connected to a variable source of D. C. potential 55, whose output varies as described below. Connecting rod 56 is rotatably attached to pin 22 at one end and pin 57 at the other. Connecting rod 58 is rotatably attached to pin 57 at one end and to shaft 59 at the other, brush contacts 60 being fixed to said other end so as to sweep the circular winding of potentiometer 62. Shaft 59 is attached to drift head 29. The dimensions involved are so chosen that the center points of pins 22, 24, and 57 and shaft 59 form a parallelogram.

As already explained, the operation of azimuth gyroscope 20 prevents rotation of pin 22 in azimuth with respect to shaft 21, or rotation in azimuth of sector gear 25. It will be seen from Figure 9 that gyroscope 20 also operates to prevent rotation in azimuth of brushes 60. It follows from this that when drift head 29 rotates one degree in azimuth around sector gear 25 in response to rotation of turn control 30, brushes 39 also rotate one degree in azimuth with respect to the winding of potentiometer 40, and the winding of potentiometer 62 rotates one degree in azimuth with respect to brushes 60. At the same time a turn of one degree in azimuth is indicated on pilot direction indicator 51 because of the movement of arm 46.

In this invention the voltage available from source 41 is constant at a value which will provide a voltage variation, across leads 42, of E volts per degree of rotation of brushes 39 with respect to the winding of potentiometer 40. The voltage available from source 55 varies in such a way that the voltage variation across leads 61 per degree rotation of the winding of potentiometer 62 with respect to brushes 60 is substantially equal at any instant to E volts per degree times the fraction of the bombing run which remains to be completed, until the instant the drift correction is applied, when the voltage from source 55 is fixed for the remainder of the run at its value at that instant. Specifically, the voltage variation per degree across leads 61 when plane A is in its second position in Figure 4 will be equal to $$E\left(1-\frac{d}{D}\right)$$

It will remain at that value for the remainder of the bombing run after the drift correction has been applied.

From the previous two paragraphs it will be seen that, with the present invention, when the plane is at its second position in Figure 4 and turn control 30 is rotated enough to rotate drift head 29 through $\theta$ degrees, the accompanying rotation of brushes 39 and the winding of potentiometer 62 will produce voltages across leads 42 and 61 of $\theta E$ volts and $$\theta E\left(1-\frac{d}{D}\right) \text{ volts}$$

respectively. These voltages are applied in series opposition to horizontal deflecting coil 17.

As stated above and shown in Figure 5, the azimuth sweep voltage is also applied to a horizontal deflecting means, coil 15. The azimuth sweep voltage at the instant the echo pulses are received is $\alpha E$ volts at the plane's second position in Figure 4, since as stated above the voltage variation per degree rotation of sweep generating means 11 is designed to be equal to the voltage variation per degree in potentiometer 40, or E volts per degree.

The results produced by the application of the three voltages just described to cathode ray tube 6 are illustrated diagrammatically in Figure 10. As indicated in Figure 10(b), the above described voltage $$\theta E\left(1-\frac{d}{D}\right)$$

from the potentiometer 62 may be considered equivalent to the second component of the drift correction voltage, while the voltage $\theta E$ from potentiometer 40 may be considered equivalent to the first component of the drift correction voltage plus the negative of the second component of the drift correction voltage.

Figure 10(a) shows the situation before any drift correction has been applied. At this point the azimuth sweep voltage is deflecting the target spot to the right.

Figure 10(b) shows the situation after the target spot has been centered by rotation of turn control 30. As is shown there, in this invention both components of the drift correction voltage are produced by the one adjustment of turn control 30, and the total turn necessary is shown at the same time on pilot direction indicator 51.

In Figure 10(c) the pilot has turned the plane through the angle α, which has removed the azimuth sweep voltage and has partially removed the turn indication from the pilot direction indicator. The drift correction voltage from potentiometer 62 has remained the same as in Figure 10(b), since it was fixed at that value, by means described below, at the instant the drift correction was calculated by the centering of the target spot.

Figure 10(d) shows the completion of the turn through the angle θ—α. The target spot has remained centered due to the influence of the voltages from potentiometer 62 and azimuth sweep generator 11, and no turn is indicated on the pilot direction indicator.

The voltages represented diagrammatically in Figure 10 by the arrows below cathode ray tube screen 10 may be described algebraically as indicated in the following three paragraphs.

If all angles measured clockwise from the airplane are considered positive and all angles measured counterclockwise negative, it will be seen from Figure 10 that the voltage from azimuth sweep generator 11 will always be equal to the constant E times the angular displacement of the transmitting and receiving antennas with respect to the airplane at the moment the echo pulses are received. Thus, in Figures 10(a) and 10(b) the azimuth sweep voltage is positive because angle α is positive by the convention stated, while in Figure 10(d) the azimuth sweep voltage is negative because angle (θ—α) is negative by that convention.

Under the same convention, it will also be seen that the drift correction voltage from potentiometer 46 will always be equal to the constant E times the negative of the angular displacement of drift head 29 with respect to the airplane. Thus, in Figures 10(b) and 10(c) this voltage is negative because the angular displacement of the drift head is positive.

Finally, it will be seen that up to the instant the drift correction is applied to put the airplane on a collision course with the target, the drift correction voltage from potentiometer 62 will be equal to $$E\left(1-\frac{d}{D}\right)$$

times the angular displacement of drift head 29 with respect to the airplane. Thus, in Figure 10(b) this voltage is positive, because drift head 29 has been rotated clockwise in azimuth. The voltage from potentiometer 62 remains the same after the drift correction has been applied, since drift head 29 and brushes 60 remain fixed in azimuth despite the rotation in azimuth of the plane. This is illustrated in Figures 10(c) and 10(d).

It will now be shown that these three voltages which are produced by potentiometers 40 and 62 and azimuth sweep generator 11 when the target spot is first centered by rotation of turn control 30 will operate to compute automatically that angle θ which will put the plane on a collision course. For a collision course with target C in Figure 4, this angle θ has been demonstrated above to be equal to $$\frac{D}{d}\alpha$$

When the target spot has been centered as in Figure 10(b), the sum of the voltages tending to move the spot either to the right or to the left must be equal to zero, so we may write:

$$\alpha E + \theta E\left(1-\frac{d}{D}\right) - \theta E = 0$$

Multiplying out and cancelling, we have:

$$\alpha E + \theta E \frac{d}{D} = 0$$

or $$\theta = \frac{D}{d}\alpha$$

which was to be proved.

Thus it is seen that by means of this invention the drift correction angle required to put a plane on a collision course is computed and applied to the pilot direction indicator automatically with a single setting of turn control 30.

It will be noticed from Figure 10 that optical telescope 33 is no longer operative, since drift head 29 is in this invention rotated through the angle θ rather than the angle α. This also means, however, that if desired the radar bombsight may be simplified even more than has been indicated in Figure 9, by actuating pilot direction indicator 51 with the output voltage from potentiometer 40, since the amount that drift head 29 is rotated by operation of turn control 30 is now equal to the angle through which the plane must be turned to achieve a collision course.

In Figure 11 is shown a schematic representation of a circuit which may be employed in this invention to produce and apply the voltage shown in Figure 9 as a source of D. C. potential 55.

Rate sweep generator 64 generates a voltage which starts falling linearly to zero when switch 644 is opened at the beginning of the bombing run. The circuit diagram shown as rate sweep generator 64 is a simplified exemplary circuit. It is to be understood that more complicated circuits known to those skilled in the art may be used to supply a more linearly decreasing voltage. Until the bombing run is begun, switch 644 is closed allowing the supply voltage to charge condenser 643.

When the run starts, switch 644 is opened allowing condenser 643 to discharge through the network of voltage regulator tube 641, potentiometer 65 and variable resistor 75. Since the voltage across voltage regulator tube 641 remains constant, the rate of discharge of condenser 643 is dependent solely upon the value of resistor 75. The purpose of voltage regulator tube 641 is to allow the rate of decrease of voltage at contact 66 to remain fixed regardless of the position of contact 66. Hence the rate at which the voltage at contact 66 decreases is exactly the same as the rate of discharge of condenser 643. Resistor 75 is initially set to a value determined by the speed at which the airplane approaches the target so that the voltage on condenser 643 decreases linearly as the distance decreases. Resistor 75 is initially adjusted to a value corresponding to the speed of the airplane by making the range line on the radar indicator intersect the target indication as the target indication moves closer on the screen.

The output voltage from the rate sweep generator 64 of the radar bombsight of Figure 5 is taken off potentiometer 65 through contact 66. This output voltage has a value, at any moment while the bombsight is in the tracking condition, which is proportional to the distance of the target from the plane. Thus the rate sweep generator produces a voltage whose magnitude falls linearly to zero during the course of a bombing run, and which magnitude is proportional at any instant to the quantity $$\left(1-\frac{d}{D}\right)$$

mentioned above.

This voltage is taken off through lead 67 and applied as shown in Figure 11 across the parallel circuit of resistor 69 (one end of which is returned to a negative potential 70), and the following resistors in series—71, 72, and 73. Resistor 73 is a variable resistor whose contact 74 shorts out some portion of its resistance to ground, depending on the position of the contact.

The initial value at the beginning of a bombing run of the voltage from rate sweep generator 64 is determined by the position of contact 66, which is controlled by the setting of position control resistor 75. Contacts 66 and 74 are ganged so that whenever contact 66 moves nearer the top of potentiometer 65 and so increases the voltage taken off through lead 67, then contact 74 moves nearer the top of resistor 73. When this happens, the fraction which resistor 73 constitutes of the series resistance of resistances 71, 72, and 73 is reduced. This reduces the fraction of the total voltage across resistors 71, 72, and 73 which appears across resistor 73. Moreover, the values of these three resistors are so chosen that when the voltage at contact 66 increases, the voltage at the junction of resistors 71 and 72, point 77, remains constant. Therefore, no matter what the initial voltage at contact 66 is at the start of a run, the initial voltage at junction point 77 of resistors 71 and 72 is always the same.

This initial voltage at point 77 is of such a value that, when it is applied through switch 78 to the control grid 81 of cathode follower 82, the voltage with respect to ground at the cathode of tube 82, or point 55, will be just equal to the voltage across D. C. potential source 41. As already explained, this voltage is such that a voltage variation will be produced across leads 42 of E volts per degree of rotation of brushes 39 with respect to the winding of potentiometer 40. The plate of cathode follower 82 is returned to positive potential 83.

Referring to the procedure of operation of resistor 75 and potentiometers 65 and 74; resistor 75 is initially set to a calibrated value corresponding to the speed of closure of the airplane and the target. Potentiometer 65 may be adjusted, and resistor 75 may be re-adjusted, by observing a range line on the radar indicator which range line is controlled by the voltage on line 67. At the beginning of the run, potentiometer 65 is set so that the range line on the radar indicator is on the target indication. Then switch 644 is opened causing condenser 643 to start discharging through resistor 75. If resistor 75 was correctly set initially, the range line and target indication move together down the range scale. Corrections can be made to the setting of resistor 75 to keep the range line on the target indication.

As stated above, during the bombing run the output voltage from rate sweep generator 64 is proportional to the quantity $$\left(1-\frac{d}{D}\right)$$

falling linearly during the run until it is equal to zero when the run is completed. It follows that after the run has been started, the voltage at point 77, being some fraction of the rate sweep voltage, also falls linearly until it is equal to zero at the end of the run. And from this it follows that, if switch 78 remains closed during the bombing run, the voltage at point 55 also falls linearly to zero, starting with a magnitude equal to that of voltage source 41.

However, switch 78 does not remain closed if a drift correction is applied by the operation of this invention, but is opened at the instant the target spot is brought back to the center of screen 10 by the operator. Because of the charge on capacitor 85, connected from grid 81 to ground, the opening of switch 78 fixes the voltage variation across leads 61 per degree rotation of brushes 60 at the value $$E\left(1-\frac{d}{D}\right) \text{ volts}$$

The variation of the voltage at point 55 during the operation of this invention may be of the kind illustrated in Figure 12. Figure 12(a) shows the voltage at point 55 if switch 78 is left closed throughout the run. Figure 12(b) shows the voltage at point 55 if a drift correction is applied after one-third of a run has been completed and switch 78 is opened at that instant.

Finally, as is shown in Figure 11, the first component of the drift correction voltage, from potentiometer 40, and the second component of the drift correction voltage, from potentiometer 62, are connected in series opposition across drift correction coil 17, resulting in the automatic drift correction calculation already described.

It will be understood that the embodiment shown and described is exemplary only, and that the scope of this invention will be determined with reference to the appended claims.

The invention described herein may be manufactured and used by or for the Government of the United States of America for governmental purposes without the payment of any royalties thereon or therefor.

What is claimed is:

1. In an electronic navigational instrument for determining in a selected geometric plane a collision course with a given object for a vessel which is first directed at the object and then is propelled through a medium which is moving in said plane with respect to said object, an automatic drift correction voltage generator comprising first power supply means operative to produce a voltage which at any particular time during the run toward said object is equal to a constant "E" times the angle of drift observed in said plane, gyroscope means operative in the selected plane, reference frame means rotatable in said plane, second power supply means operative to produce a voltage which at any particular time during the run toward said object after the vessel has been headed toward the object but before the instant at which the collision course is determined is equal to said constant "E" times the angle in said plane between said reference frame means and the vessel, control means for rotating the reference frame means in said plane with respect to the gyroscope means, third power supply means operative to produce a voltage at any time up to said instant equal to $$\frac{D-d}{D}$$

times the output voltage of the second power supply means where D is the slant range to the object at the start of said run and $d$ is the distance traveled along the original heading of the vessel from the start of the run up to said instant, means for subtracting the output voltage of the third power supply means from the output voltage of the second power supply means, means for comparing the magnitude of the resulting difference with the output of the first power supply means, and control means for said third power supply means operative to fix the output voltage thereof for the remainder of the run after said instant at its value at that particular instant.

2. In an electronic navigational instrument for determining in a selected geometric plane a collision course with a given object for a vessel which is first directed at the object and then is propelled through a medium which is moving in said plane with respect to said object, an automatic drift correction voltage generator comprising gyroscope means operative in said plane, reference frame means rotatable in said plane, control means for rotating said reference frame means in said plane with respect to said gyroscope means, first power supply means providing a constant voltage, second power supply means operative to produce a voltage proportional at any instant to the range to said object, first potentiometer means having a winding positioned in the selected plane and attached to said vessel and having rotatable brushes in contact therewith, means applying the first power supply means output voltage across the winding of the first potentiometer means, voltage divider means including an output terminal, means applying the second power supply means output to said voltage divider means, control means for the voltage divider means operative to cause the voltage at said output terminal to be equal at the start of a run toward said object to the first power supply means output voltage, switch means, capacitor means, second potentiometer means having a winding positioned in the selected plane and attached to said reference frame means and having rotatable brushes in contact therewith, means applying the voltage at said output terminal through the switch means and across the parallel combination of the capacitor means and the winding of the second potentiometer means, means connecting said reference frame means with the rotatable brushes of the first potentiometer means to produce the same rotation in the selected plane in the latter as in the former, means connecting said gyroscope means with the rotatable brushes of the second potentiometer means to hold the latter stationary in the selected plane, and means subtracting the output voltage of the second potentiometer means from the output voltage of the first potentiometer means.

3. In an electronic navigational instrument for determining in a selected geometric plane a collision course with a given object for a vessel which is first directed at the object and then is propelled through a medium which is moving in said plane with respect to said object, an automatic drift correction voltage generator comprising gyroscope means operative in said plane, reference frame means rotatable in said plane, control means for rotating said reference frame means in said plane with respect to said gyroscope means, first power supply means providing a constant voltage, second power supply means operative to produce a voltage proportional at any instant to the range to said object, first potentiometer means having a winding positioned in the selected plane attached to the vessel and having rotatable brushes in contact therewith, means applying the first power supply means output voltage across the winding of said first potentiometer means, voltage divider means including an output terminal, means applying the second power supply means output to said voltage divider means, a cathode follower tube including a cathode and control grid, second potentiometer means having a winding positioned in said plane and attached to said reference frame means and having rotatable brushes in contact therewith, means connecting the winding of said second potentiometer means in the cathode circuit of said cathode follower tube, switch means, capacitor means connected between said control grid and ground, means applying the voltage at said output terminal through the switch means to said control grid, control means for said voltage divider means operative to cause the voltage at the cathode of said tube to be equal at the start of a run toward said object to the first power supply means output voltage, means connecting said reference frame means with the rotatable brushes of the first potentiometer means to produce the same rotation in the selected plane in the latter as in the former, means connecting said gyroscope means with the rotating brushes of the second potentiometer means to hold the latter stationary in the selected plane, and means subtracting the output voltage of the second potentiometer means from the output voltage of the first potentiometer means.

4. An electronic navigational instrument for determining in a selected geometric plane a collision course with a given target for a vessel which is first directed at the target and then is propelled through a medium which is moving in said plane with respect to the target, comprising an echo ranging transmitter, directional antenna means, control means therefor operative to vary the orientation in the selected plane of a particular directional characteristic thereof, an echo ranging receiver, means in said receiver operative to deliver an impulse whenever said directional characteristic is aligned with the direction of an incoming signal, means generating a sweep voltage equal at any moment to a constant "E" times the clockwise angular displacement in said plane with respect to the vessel on which the navigational instrument is installed of said directional characteristic of the antenna means, indicator means including means for producing a target indication under application of said receiver output impulses, gyroscope means operative in the selected plane, reference frame means rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said target after the vessel has been headed toward the target but before the instant at which the collision course is determined bears the same ratio to said first power supply means output voltage as the negative of the ratio of the range to the target at that particular time divided by the range to the target at the start of said run, control means therefor operative to fix the output voltage of the second power supply means for the remainder of the run after said instant at its value at that particular instant, and further control means for said cathode ray tube responsive to the algebraic sum of the sweep voltage and the two power supply means output voltages to deflect the electron beam.

5. An electronic navigational instrument for determining in a selected geometric plane a collision course with a source of a radio signal for a vessel which is first directed at said source and then is propelled through a medium which is moving in said plane with respect to said source, comprising directional antenna means, control means therefor operative to vary the orientation in said plane of a particular directional characteristic thereof, a receiver, means in said receiver operative to deliver an impulse whenever said directional characteristic is aligned with the direction of an incoming signal, means generating a sweep voltage equal at any moment to a constant "E" times the clockwise angular displacement in said plane with respect to the vessel on which the navigational instrument is installed of said directional characteristic of the antenna means, indicator means including means for producing a target indication under application of said receiver output impulses, gyroscope means operative in the selected plane, reference frame means rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said signal source after the vessel has been headed toward the signal source but before the instant at which the collision course is determined bears the same ratio to said first power supply means output voltage as the negative of the ratio of the range to the signal source at that particular time divided by the range to the signal source at the start of said run, control means therefor operative to fix the output voltage of the second power supply means for the remainder of the run after said instant at its value at that particular instant, and further control means for said cathode ray tube responsive to the algebraic sum of the sweep voltage and the two power supply means output voltages to deflect the electron beam.

6. An electronic navigational instrument for determining in a selected geometric plane a collision course with a given target for a vessel which is first directed at the target and then is propelled through a medium which is moving in said plane with respect to the target, comprising an echo ranging transmitter, directional antenna means, control means therefor operative to vary the orientation in the selected plane of a particular directional characteristic thereof, an echo ranging receiver, means in said receiver operative to deliver an impulse whenever said directional characteristic is aligned with the direction of an incoming signal, means generating a sweep voltage equal at any moment to a constant "E" times the clockwise angular displacement in said plane with respect to the vessel on which the navigational instrument is installed of said directional characteristic of the antenna means, a cathode ray indicator tube including means for producing a target spot on the screen thereof under application of said receiver output impulses, gyroscope means operative in the selected plane, reference frame means rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said target after the vessel has been headed toward the target but before the instant at which the collision course is determined bears the same ratio to said first power supply means output voltage as the negative of the ratio of the range to the target at that particular time divided by the range to the target at the start of said run, control means therefor operative to fix the output voltage of the second power supply means for the remainder of the run after said instant at its value at that particular instant, and further control means for said cathode ray tube responsive to the algebraic sum of the sweep voltage and the two power supply means output voltages to deflect the electron beam.

7. An electronic navigational instrument for determining in a selected geometric plane a collision course with a given target for a vessel which is first directed at the target and then is propelled through a medium which is moving in said plane with respect to the target, comprising a transmitter operative to produce recurrent pulses of electromagnetic energy waves, directional antenna means operative to transmit said pulses and to receive those of said pulses which are reflected from said target while a particular directional characteristic of the antenna means is facing in the direction of the target, control means therefor operative to vary the orientation in the selected plane of said particular directional characteristic, a receiver, means in said receiver operative to deliver an impulse for each received pulse of electromagnetic energy waves, means generating a sweep voltage equal at any moment to a constant "E" times the clockwise angular displacement in said plane with respect to the vessel on which the navigational instrument is installed of said directional characteristic of the antenna means, indicator means including means for producing a target indication under application of said receiver output impulses, gyroscope means operative in the selected plane, reference frame means rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said target after the vessel has been headed toward the target but before the instant at which the collision course is determined bears the same ratio to said first power supply means output voltage as the negative of the ratio of the range to the target at that particular time divided by the range to the target at the start of said run, control means therefor operative to fix the output voltage of the second power supply means for the remainder of the run after said instant at its value at that particular instant, and further control means for said cathode ray tube responsive to the algebraic sum of the sweep voltage and the two power supply means output voltages to deflect the electron beam.

8. An electronic navigational instrument for determining in a selected geometric plane a collision course with a given target for a vessel which is first directed at the target and then is propelled through a medium which is moving in said plane with respect to the target, comprising an echo ranging transmitter, directional antenna means, control means therefor operative to vary the orientation in the selected plane of a particular directional characteristic thereof, an echo ranging receiver, means in said receiver operative to deliver an impulse whenever said directional characteristic is aligned with the direction of an incoming signal, means generating a sweep voltage equal at any moment to a constant "E" times the clockwise angular displacement in said plane with respect to the vessel on which the navigational instrument is installed of said directional characteristic of the antenna means, indicator means including means for producing a target indication under application of said receiver output impulses, gyroscope means operative in the selected plane, reference frame means rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said target after the vessel has been headed toward the target but before the instant at which the collision course is determined bears the same ratio to said first power supply means output voltage as the negative of the ratio of the slant range to the target at that particular time divided by the slant range to the target at the start of said run, control means therefor operative to fix the output voltage of the second power supply means for the remainder of the run after said instant at its value at that particular instant, and further control means for said cathode ray tube responsive to the algebraic sum of the sweep voltage and the two power supply means output voltages to deflect the electron beam.

9. An electronic navigational instrument for determining in a selected geometric plane a collision course with a given target for a vessel which is first directed at the target and then is propelled through a medium which is moving in said plane with respect to the target, comprising an echo ranging transmitter, directional antenna means, control means therefor operative to vary the orientation in the selected plane of a particular directional characteristic thereof, an echo ranging receiver, means in said receiver operative to deliver an impulse whenever said directional characteristic is aligned with the direction of an incoming signal, means generating a sweep voltage equal at any moment to a constant "E" times the clockwise angular displacement in said plane with respect to the vessel on which the navigational instrument is installed of said directional characteristic of the antenna means, indicator means including means for producing a target indication under application of said receiver output impulses, gyroscope means operative in the selected plane, reference frame means rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said target after the vessel has been headed toward the target but before the instant at which the collision course is determined bears the same ratio to said first power supply means output voltage as the negative of the ratio $$\frac{D-d}{D}$$

where D is the slant range to the target at the start of said run and d is the distance traveled along the original heading of the vessel from the start of the run up to said instant, control means therefor operative to fix the output voltage of the second power supply means for the remainder of the run after said instant at its value at that particular instant, and further control means for said cathode ray tube responsive to the algebraic sum of the sweep voltage and the two power supply means output voltages to deflect the electron beam.

10. An electronic navigational instrument for determining in a selected geometric plane a collision course with a given target for a vessel which is first directed at the target and then is propelled through a medium which is moving in said plane with respect to the target, comprising an echo ranging transmitter, directional antenna means, control means therefor operative to vary the orientation in the selected plane of a particular directional characteristic thereof, an echo ranging receiver, means in said receiver operative to deliver an impulse whenever said directional characteristic is aligned with the direction of an incoming signal, means generating a sweep voltage equal at any moment to a constant "E" times the clockwise angular displacement in said plane with respect to the vessel on which the navigational instrument is installed of said directional characteristic of the antenna means, indicator means including means for producing a target indication under application of said receiver output impulses, gyroscope means operative in the selected plane, reference frame means, rotatable in said plane, control means for rotating said reference frame means in said plane with respect to said gyroscope means, first power supply means operative to produce a voltage equal to said constant "E" times the negative of the clockwise angular displacement in said plane of said reference frame with respect to the vessel, second power supply means operative to produce a voltage which at any particular time during the run toward said target after the vessel has been headed toward the target but before the instant at which the collision course is determined bears the same ratio to said first power supply means output voltage as the negative of the ratio of the range to the target at that particular time divided by the range to the target at the start of said run, control means therefor operative to fix the output voltage of the second power supply means for the remainder of the run after said instant at its value at that particular instant, further control means for said cathode ray tube responsive to the algebraic sum of the sweep voltage and the two power supply means output voltages to deflect the electron beam, and a meter actuated by said first power supply means output voltage to indicate the number of degrees the vessel should be turned in the selected plane to assume a collision course with the target.

11. A navigational instrument for determining the collision bearing of a vessel moving toward an object in a cross current comprising, a radar system including a cathode ray tube indicator means comprising apparatus for horizontally positioning the beam of the indicator relative to a reference position in accordance with the angle between the heading of the vessel and the relative bearing of the object, a reference frame the bearing of which is adjustable, gyroscope means for holding said reference frame in a position of a bearing adjustment, a first voltage generator coupled to said reference frame and operable to deliver an output voltage dependent upon the angle between the bearing of the vessel and the bearing of the reference frame, a second voltage generator also coupled to said frame operable to deliver an output voltage which is a fraction of the first voltage dependent upon the fraction of the collision run which remains to be completed at the instant of adjustment of said frame, and which is further dependent upon the angle between the bearing of the frame and a reference direction, means responsive to the difference in the output voltages of said first and second voltage generators for horizontally deflecting the beam of said cathode ray tube in a direction opposite to the direction caused by a shift in bearing of the vessel relative to the object position, and control means for rotating said reference frame to a point where the beam of said cathode ray tube indicator means is centered at said reference position.

12. A navigational instrument for determining the collision bearing of a vessel moving toward an object in a cross current comprising, a radar system including a cathode ray tube indicator means comprising apparatus for horizontally positioning the beam of the indicator relative to a reference point in accordance with the angle between the heading of the vessel and the relative bearing of the object, a reference frame the bearing of which is adjustable, gyroscope means for holding said reference frame in a position of bearing adjustment, a first voltage generator coupled to said reference frame and operable to deliver an output voltage dependent upon the angle between the bearing of the vessel and the bearing of the reference frame, a second voltage generator also coupled to said frame operable to deliver an output voltage which is a fraction of the first voltage dependent upon the fraction of the collision run which remains to be completed at the instant of adjustment of said frame, and which is further dependent upon the angle between the bearing of the frame and a reference direction, means responsive to the difference between the output voltages of said first and second voltage generators for horizontally deflecting the beam of said cathode ray tube in a direction opposite to the direction caused by a shift in bearing of the vessel relative to the object position, control means for rotating said frame to a point where the beam of said cathode ray tube indicator is centered at said reference position, and an indicator means indicating to the pilot of the vessel the angle of rotation of said frame from its reference position.

References Cited in the file of this patent

UNITED STATES PATENTS

| Number | Name | Date |
|---|---|---|
| 2,418,465 | Doba | Apr. 8, 1947 |
| 2,600,428 | Pooler | June 17, 1952 |